United States Patent
Laser et al.

(10) Patent No.: US 9,856,398 B2
(45) Date of Patent: Jan. 2, 2018

(54) METHOD FOR CONTROLLING DEPOSITS ON PAPERMAKING SURFACES

(71) Applicant: DuBois Chemicals, Inc., Sharonville, OH (US)

(72) Inventors: Harold Laser, Hamilton (CA); Brandon E. Mahler, Cincinnati, OH (US)

(73) Assignee: DuBois Chemicals, Inc., Sharonville, OH (US)

( * ) Notice: Subject to any disclaimer, the term of this patent is extended or adjusted under 35 U.S.C. 154(b) by 21 days.

(21) Appl. No.: 14/972,235

(22) Filed: Dec. 17, 2015

(65) Prior Publication Data

US 2016/0177505 A1 Jun. 23, 2016

Related U.S. Application Data

(60) Provisional application No. 62/095,205, filed on Dec. 22, 2014.

(51) Int. Cl.
| | |
|---|---|
| *D21F 1/30* | (2006.01) |
| *D21F 1/32* | (2006.01) |
| *C09D 179/04* | (2006.01) |
| *C09D 167/02* | (2006.01) |
| *C09D 175/02* | (2006.01) |
| *C09D 161/28* | (2006.01) |
| *D21H 23/78* | (2006.01) |
| *D21H 19/26* | (2006.01) |
| *D21H 19/28* | (2006.01) |
| *D21H 21/02* | (2006.01) |

(52) U.S. Cl.
CPC ......... *C09D 179/04* (2013.01); *C09D 161/28* (2013.01); *C09D 167/02* (2013.01); *C09D 175/02* (2013.01); *D21H 19/26* (2013.01); *D21H 19/28* (2013.01); *D21H 21/02* (2013.01); *D21H 23/78* (2013.01)

(58) Field of Classification Search
CPC ............ D21F 1/32; D21F 1/0027; D21F 7/08; D21G 1/02; D21H 3/00; Y10S 162/04; C11D 1/72; C11D 3/0036; C11D 3/37; C09D 161/28; C09D 167/02; C09D 175/02; C09D 179/04
See application file for complete search history.

(56) References Cited

U.S. PATENT DOCUMENTS

| | | | | |
|---|---|---|---|---|
| 4,571,303 A | * | 2/1986 | Ciallella | C11D 3/0036 510/299 |
| 4,711,730 A | * | 12/1987 | Gosselink | C08G 63/672 442/102 |
| 4,785,060 A | * | 11/1988 | Nagler | C08G 63/672 510/299 |
| 4,883,610 A | * | 11/1989 | Ciallella | C11D 3/3715 427/393.4 |
| 4,886,575 A | | 12/1989 | Moreland | |
| 5,080,759 A | | 1/1992 | Buzby et al. | |
| 5,135,613 A | | 8/1992 | Waldmann | |
| 5,139,616 A | | 8/1992 | Ling | |
| 5,223,097 A | | 6/1993 | Hassler | |
| 5,300,194 A | | 4/1994 | Welkener et al. | |
| 5,368,694 A | | 11/1994 | Rohlf et al. | |
| 5,415,739 A | | 5/1995 | Furman, Jr. et al. | |
| 5,863,385 A | | 1/1999 | Siebott et al. | |
| 5,916,857 A | | 6/1999 | Watson et al. | |
| 6,051,108 A | | 4/2000 | O'Neal, Jr. | |
| 6,060,439 A | | 5/2000 | Doyel et al. | |
| 6,153,723 A | | 11/2000 | Lang et al. | |
| 6,172,031 B1 | | 1/2001 | Stevens | |
| 6,369,010 B1 | | 4/2002 | Dreisbach et al. | |
| 6,402,891 B1 | | 6/2002 | Asher et al. | |
| 6,451,756 B2 | * | 9/2002 | Shulman | C11D 3/3757 510/475 |
| 6,723,207 B2 | * | 4/2004 | Laser | D21G 1/02 162/164.6 |
| 6,890,405 B1 | | 5/2005 | Mah | |
| 7,101,832 B2 | | 9/2006 | Asher et al. | |
| 7,850,824 B2 | | 12/2010 | Baker et al. | |
| 8,440,598 B2 | | 5/2013 | Sehgal et al. | |

(Continued)

FOREIGN PATENT DOCUMENTS

| | | | |
|---|---|---|---|
| CA | 2228774 A1 | 8/1998 | |
| CA | 2916074 A1 * | 6/2016 | ........... C09D 167/02 |
| CN | 104631187 A | 5/2015 | |
| EP | 178340 A1 | 11/1990 | |
| EP | 648820 A2 | 4/1995 | |
| EP | 773284 A1 | 5/1997 | |
| EP | 647737 A1 | 5/1999 | |
| EP | 1493803 B1 | 6/2006 | |
| EP | 1956075 A1 | 8/2008 | |
| EP | 2921541 A1 * | 9/2015 | ......... C08G 18/4837 |
| WO | 2008045096 A1 | 4/2008 | |
| WO | 2009137096 A1 | 11/2009 | |

OTHER PUBLICATIONS

Alfonic® Alcohol Ethoxylates from High Range Alcohols C12-C18; Technical Data Sheet; Sasol North America Inc.; Jan. 2003; pp. 1-3.

(Continued)

*Primary Examiner* — Jose Fortuna
(74) *Attorney, Agent, or Firm* — Dinsmore & Shohl LLP (57) ABSTRACT

A method of controlling deposits on papermaking surfaces or fabrics on paper machines includes applying a deposition control solution to the papermaking surfaces or fabrics to inhibit deposition of organic contaminants therein. The deposition control solution comprises at least one cationic polymer, at least one at least one phthalate/glycol or polyethylene terephthalate/polyoxyethylene terephthalate (PET:POET) or polyalkylene terephthalate/polyoxyethylene terephthalate (PAT:POET) based copolymer, and at least one non-ionic surfactant in combination to provide improved deposition control.

32 Claims, 2 Drawing Sheets

(56) References Cited

U.S. PATENT DOCUMENTS

| | | | |
|---|---|---|---|
| 9,512,387 B2* | 12/2016 | Laser | C11D 3/2037 |
| 2001/0036912 A1* | 11/2001 | Shulman | C11D 3/3757 |
| | | | 510/475 |
| 2003/0064910 A1 | 4/2003 | Fong | |
| 2003/0148911 A1 | 8/2003 | Smith et al. | |
| 2004/0020617 A1* | 2/2004 | Laser | D21G 1/02 |
| | | | 162/199 |
| 2006/0272789 A1* | 12/2006 | Szep | D06M 11/38 |
| | | | 162/199 |
| 2008/0087393 A1 | 4/2008 | Pease et al. | |
| 2009/0281012 A1 | 11/2009 | Trivedi et al. | |
| 2011/0119841 A1* | 5/2011 | Bennett | C11D 3/3723 |
| | | | 8/687 |
| 2012/0043040 A1 | 2/2012 | Zhang et al. | |
| 2012/0204916 A1* | 8/2012 | Laser | C11D 3/2037 |
| | | | 134/198 |
| 2012/0264669 A1* | 10/2012 | Cristobal | C11D 1/72 |
| | | | 510/299 |
| 2015/0148279 A1* | 5/2015 | Laser | C11D 3/2037 |
| | | | 510/276 |
| 2016/0081890 A1* | 3/2016 | Stevenson | A61Q 5/02 |
| | | | 424/401 |
| 2016/0177505 A1* | 6/2016 | Laser | C09D 167/02 |
| | | | 162/199 |
| 2017/0009184 A1* | 1/2017 | Schubert | C11D 3/2093 |
| 2017/0029748 A1* | 2/2017 | Laser | C11D 11/0017 |

OTHER PUBLICATIONS

Rhodiasolv® IRIS; Rhodia; http://www.rhodia.com/en/binaries/novecare_rhodiasolv_iris_flyer_EN; Mar. 2008.
Hansen, C.; What are HSP?; www/hansen-solubility.com/index.php?; May 29, 2007; pp. 1-3.
BIO-TERGE© PAS-8S; Products page; Stepan Company; p. 1; 2011.
BIO-SOFT© S-101; Products page; Stepan Company; p. 1; 2011.
Isophorone Product Information; The Dow Chemical Company; Jun. 2002; pp. 1-2.
Proglyde DMM Product Information; The Dow Chemical Company; Mar. 2004; pp. 1-2.
Dowanol DPnB Product Information; The Dow Chemical Company; Mar. 2004; pp. 1-3.
Dowanol TPnB Product Information; The Dow Chemical Company; Mar. 2004; pp. 1-2.
Tomadol® 25-12 Ethoxylated Alcohol; Product Information; Air Products and Chemicals, Inc. 1996-2011; p. 1.
Stach, S.; Using Hansen Space to Optimize Solvent Based Cleaning Processes for Manufacturing Electronic Assemblies; The Science of Cleaning; Jun. 18, 2009; pp. 1-9; Austin American Technology; Burnet, Texas.
Examiner's Report dated Nov. 1, 2013, relating to corresponding Canadian Patent Application No. 2,764,794.
Search Report and Written Opinion pertaining to Application No. PCT/US2016/044797 dated Oct. 31, 2016.
The Paper Machine Wet Press Manual, Third Edition, Revised, pp. 69-71, 1991.

* cited by examiner

METHOD FOR CONTROLLING DEPOSITS ON PAPERMAKING SURFACES

CROSS REFERENCE TO RELATED APPLICATIONS

This application claims the benefit of U.S. Provisional Application Ser. No. 62/095,205, filed Dec. 22, 2014.

TECHNICAL FIELD

The present disclosure is generally directed to deposition control on papermaking fabrics and surfaces, and is specifically directed to control of the deposition of deleterious contaminants in and on paper machine fabrics, felts and surfaces through the use of a combination of at least one phthalate/glycol based copolymer in conjunction with cationic polymers, and optionally one non-ionic surfactant

BACKGROUND

It is important to the operation of a paper machine that all the papermaking fabrics remain clear of contamination, which would impede the drainage of the wet paper sheet. Papermaking fabrics include forming fabrics, wires, press fabrics, conveying belts, and any fabric that is used either as a drainage element on a paper machine or used to impart molded properties to a sheet of paper including fabrics used in through-air-drying (TAD) processes. This may also include fabrics used in drying paper such as dryer felts. In addition papermaking rolls may be subject to contamination. These rolls may or may not contact the surface of a paper sheet. In either case contamination on the surface of these rolls may impede the ability to operate a papermachine effectively or may cause quality defects in the paper itself. Papermaking rolls could include press rolls, suction rolls, transfer rolls, felt carrying rolls, tension rolls. Contamination may also occur on other surfaces of a paper machine including uhle box covers, foils, molding boxes, pickup shoes, etc. This contamination can occur in many forms and may consist of a variety of inorganic scales and deposits as well as organic materials which may include naturally derived wood pitch, lignins, and small diameter wood derived cellulosic materials commonly called "fines". Additional contaminants include synthetic materials including various types of adhesives, paper additives such as sizing agents including alkyl ketene dimer (AKD), alkyl succinic anhydride (ASA) and rosin sizes, latexes, wet and dry strength additives and polymers. Many of these types of materials naturally exist and are commonly added to the papermaking stock to impart certain desirable properties to the final paper sheet or to aid in the processing of the paper sheet during manufacture on the paper machine.

In the area of tissue manufacture, additional additives are used which impart properties such as softness, wet strength and dry strength. These additives may be added into the papermaking stock prior to the paper machine or they may be added during the pressing stage. These additives include polymeric strength additives, such as polyaminoamidoepichlorohydrin, polyvinylamines, imidazolines, anionically stabilized dispersions, oil and wax emulsions, and dispersions either anionically or nonionically stabilized, fatty acids and triglycerides and derivatives thereof. These additives may also be added onto the surface of the drying can during the drying stage of tissue paper manufacture. Additionally, these additives may be used to change the surface properties of the sheet as well as the behavior of the paper sheet in the creping process which uses a blade to scrape the paper sheet from the surface of the drying can.

In addition, recycled paper and paper fibers used as a component of the papermaking slurry often contain a variety of deleterious contaminants including, but not limited to, adhesives, waxes, sizes, strength additives, oils, and materials commonly referred to as "stickies".

Currently, a variety of treatments are used to prevent the deposition of contaminants on paper machine fabrics. These treatment methods include surfactants, which normally consist of anionic, nonionic and cationic low molecular weight molecules. The surfactants function primarily by emulsifying or dispersing existing contamination in the paper machine fabric. In addition, a variety of polymers has been used to prevent contamination. These polymers are typically cationic in nature. They function primarily by passivating papermaking surfaces. and preventing the deposition of contaminants on those surfaces. In one instance, the utility of these polymers is limited due to their tendency to accumulate on the papermaking fabric fibers and cause a decrease in the papermaking fabric performance. The decrease in the papermaking fabric performance is typically a result of plugging the pores and the void volume of the paper machine fabric. In another instance, the utility of the cationic polymers is limited by the fact that they are consumed by anionic components in the papermaking slurry or furnish thereby reducing their effectiveness or forming tacky reaction products.

Terephthalic based polymers based on the copolymer polyethylene terephthalate: polyoxyethylene terephthalate (PET:POET) have also been used to prevent the deposition of organic deposits on papermaking fabrics. These polymers have an affinity for the surface of press fabrics and prevent the deposition of organic contaminants on their surface. However, usage rates tend to be higher and their efficacy is diminished because they have a lower persistence on papermachine fabrics and may rinse out more easily. In addition the effectiveness of these polymers may be diminished by dissolved materials in the papermaking furnish which may either interfere with the adsorption of the PET:POET or their derivatives onto the papermaking surface.

Accordingly, a method of effectively controlling deposits on papermaking fabrics on paper machines is desired.

SUMMARY

Embodiments of the present disclosure are directed to methods of controlling deposits on papermaking fabrics on paper machines.

According to one embodiment, a method of controlling deposits on papermaking fabrics on paper machines is provided. The method comprises applying a deposition control solution to the papermaking fabrics to inhibit deposition of organic contaminants therein. The deposition control solution comprises at least one cationic polymer, at least one phthalate/glycol or polyethylene terephthalate/polyoxyethyleneterephthalate (PET:POET) or polyalkylene/polyoxyethyleneterephthalate (PAT:POET) based copolymer, and optionally at least one non-ionic surfactant.

According to another embodiment, a method of controlling deposits on papermaking fabrics on paper machines is provided. The method comprises applying through at least one high-pressure needle shower or at least one chemical fan shower a deposition control solution to the papermaking fabrics. The deposition control solution inhibits deposition of organic deposits therein. The deposition control solution comprises about 1% to about 50% by wt. of solids of at least one cationic polymer, about 1% to about 50% by wt. of solids of a branched polyalkylene terephthalate and alkyl capped polyoxyethylene terephthalate copolymers and about 1% to about 20% by wt. of solids of at least one non-ionic surfactant.

According to yet another embodiment, a solution for controlling deposits on paper machine fabrics is provided. The solution comprises about 1% to about 50% by wt. of solids of at least one cationic polymer, about 1% to about 50% by wt. of solids of at least one phthalate/glycol or polyethylene terephthalate/polyoxyethyleneterephthalate (PET:POET) or polyalkylene/polyoxyethyleneterephthalate (PAT:POET) based copolymer, and optionally about 1% to about 20% by wt. of solids of at least one non-ionic surfactant.

These and additional objects and advantages provided by the embodiments of the present invention will be more fully understood in view of the following detailed description.

BRIEF DESCRIPTION OF THE DRAWINGS

The following detailed description of specific embodiments of the present disclosure can be best understood when read in conjunction with the drawings enclosed herewith.

DETAILED DESCRIPTION

Generally, the paper manufacturing process employs a paper machine that systematically de-waters pulp slurry, which consists largely of cellulose wood fibers, along with various chemical additives used as fillers and functional components of the paper or paper products. The pulp is prepared from various species of wood, generally by one of two pulping methods: chemical digestion to separate the cellulose fibers from lignin and other natural organic binders, or by mechanical grinding and refining. In addition, pulp may be prepared by slurrying recycled fibers derived from old newsprint, cardboard, cartons, magazines, clippings, mixed office waste and a variety of other sources of post and pre consumer paper waste. The resulting cellulose fibers are used in the manufacture of paper products whereby the pulp is supplied to a paper machine system, slurried in water to various solids levels (consistency), and ultimately diluted to about 0.5-1.0% solids for subsequent de-watering to form a sheet of paper. The low consistency of solids is necessary in order to facilitate fast drainage in the papermaking machine while achieving proper fiber-to-fiber contact and orientation in the sheet. De-watering begins on a synthetic wire or mesh that permits drainage to form a wet-web. This synthetic wire may be composed of polyester, nylon, or a blend of the two.

The web is then transferred into the machine press section and is squeezed between roller nips and synthetic press felts (predominantly comprised of nylon and/or polyester) to further remove water, and then through a dryer section comprised of steam-heated roller cans. Finally, the sheet is wound onto a reel. Other process stages can include on-machine surface sizing, coating, and/or calendaring to impart functional paper characteristics. Machine configurations may also include cylinder machines, tissue machines which include crescent formers, C-wrap, S-wrap, creped and uncreped TAD machines which include a variety of proprietary processes and machine configurations. The methods and solutions for controlling deposits on papermaking machine surfaces or fabrics of this disclosure may be applied to any paper machine presently known or known in the future.

Embodiments of the present disclosure are directed to methods of controlling deposits on papermaking surfaces or fabrics on paper machines. Specifically, the method includes applying a deposition control solution to the papermaking fabrics to inhibit deposition of organic contaminants therein. The deposition control solution comprises at least one cationic polymer, at least one phthalate/glycol based copolymer, and optionally at least one non-ionic surfactant. It has been surprisingly found that a combination a phthalate/glycol based copolymer when applied simultaneously with cationic polymers has a superior deposit prevention effect on paper machine fabrics when compared to either component applied alone. A significant disadvantage of applied cationic polymers either alone or with conventional surfactants is that the polymer has a tendency to accumulate on papermachine fabrics and thereby impede drainage through the successive accumulation of said cationic polymer on the papermachine fabric.

Phthalate/glycol and polyethylene terephthalate/polyoxyethyleneterephthalate (PET:POET) and polyalkylene/polyoxyethyleneterephthalate (PAT:POET) based copolymers have an affinity for the surface of papermaking fabrics and thereby impart a resistance to the buildup of cationic polymers on papermaking fabrics and surfaces. Without being bound by theory it is believed that this allows the cationic polymers to detackify and neutralize the organic materials and also to act as a blocking agent, which prevents organic materials from adhering to each other and to the fabric surface. This inhibitory effect results in the preservation of the drainage characteristic of the paper machine fabrics.

It is normally difficult to remove existing contamination or to disperse this contamination in order to renew the operation of a soiled papermaking fabric. By preventing the formation of these deposits in the papermaking fabrics, the need to remove, clean or disperse these deposits from the press felt on a continuous basis or by shutting the papermaking machine down is decreased significantly.

The deposition of deleterious substance is inhibited by the application of the specified deposition control solution. Specifically, the application of the deposition control solution results in decrease in the accumulation of the deleterious substance on the papermaking surface as well as a decrease of the formation of papermaking contaminants on such surfaces and specifically in the void volume or open areas of the press felt.

The phthalate/glycol or PET:POET or PAT:POET based copolymer may comprise various suitable compositions having an affinity for the surface of papermaking fabrics and surfaces thereby imparting a resistance to the buildup of cationic polymers on papermaking fabrics and surfaces. For example and not by way of limitation, the phthalate/glycol based copolymer may comprise hydrophilically modified polyesters formed from monomers comprising terephthalic acid, dimethyl terephthalic acid, polyglycols, diols, and polyhydric alcohols. Additionally, the phthalate/glycol based copolymers may be the result of a polymerization reaction between a first co-monomer species selected from the group consisting of methyl terephthalate or terephthalic acid, polyoxyethylene, ethylene glycol, propylene glycol, and methyl capped polyethylene glycol and a second co-monomer species selected from the group consisting of polypropylene glycol, block copolymers of ethylene oxide, and block copolymers of propylene oxide. Yet further examples include polymers formed from the polymerization of terephthalic acid or terephthalate esters, isophthalic acid or isophthalic esters and their sulfo analogs including sulfoisophthalic acid with alkylene glycols including polyethylene glycol, polypropylene glycol, polyethylene-polypropylene glycol block and random copolymers, ethylene glycol, propylene glycol, hexylene glycol and other short chain difunctional alcohols or alkyl-capped derivative of these alcohols. Further, non-limiting specific examples of the phthalate/glycol based copolymer include polyoxyethylene terephthalate and polyethylene terephthalate, and polyalkylene terephthalate and alkyl capped polyoxyethylene terephthalate copolymers. PET:POET or PET:PAET may also include branched copolymers such as copolymers of dimethyl terephthalate, ethylene glycol, propane-1,2-diol, tetramethylolmethane, polyethylene glycol and polyethylene glycol monomethyl ether with a terephthalic acid content of 10-30%, These polymers may be further modified or based on the addition products formed by the addition or substitution of the aforementioned glycols by C3-C8 polyols including glycerol, tetramethylolmethane and sugar alcohols including sorbitols, mannitol and xylitol resulting in linear and branched polymers and oligimers. Examples of such polymers would include Repel-O-Tex QCJ (Solvay, Belgium), Repel-O-Tex Crystal (Solvay, Belgium), Startex, Cirrasol PE113 (Croda International, United Kingdom), In one or more embodiments, the phthalate/glycol based copolymer is a terephthalate polymer modified by polyethylene glycol, alkylene glycol, C3-C8 polyols, and/or methyl capped polyethylene glycol to result in a low to medium weight amphiphilic polymer ranging from a molecular weight (MW) of approximately 3,000 to approximately 100,000. In certain embodiments the average MW range is 8,000-30,000. The phthalate/glycol based copolymer may also be described as a copolymer of dimethyl terephthalate, ethylene glycol, propane-1,2-diol, tetramethylolmethane, polyethylene glycol and polyethylene glycol monomethyl ether with a terephthalic acid content of 10-30%. Furthermore the phthalate/glycol based copolymer may be branched with the inclusion of a polyhydric alcohol in the copolymer.

In one or more embodiments, the phthalate/glycol based polymers are copolymers of dimethyl terephthalate, ethylene glycol, propane-1,2-diol, polyethylene glycol, methyl capped polyethylene glycol, and an polyhydric alcohol which has the general formula of $C_nH_x(OH)_y$ where n=2-6, y=2-6 and x=(2n+2)-y.

The cationic polymer may comprise various suitable compositions. In general, these cationic polymers are water-soluble and are formed from cationic monomer units or both cationic and non-ionic monomer units. As used herein, "cationic polymer" means that the monomer unit includes a group which either carries a positive charge or which has basic properties or can be protonated under mild acidic conditions.

In an embodiment, the cationic polymer may comprise a quaternary ammonia compound. These quaternary ammonia polymers are generally derived from ethylenically unsaturated monomers containing a quaternary ammonium group or obtained by reaction between an epihalohydrin and one or more amines such as those obtained by reaction between a polyalkylene polyamine and epichlorohydrin or by reaction between epichlorohydrin, dimethyl amine and either ethylenediamine or polyalkylene polyamine. For example, the cationic polymer may comprise a cationic polyurea such as dicyandiamide based urea or melamine formaldehyde copolymer.

Further suitable cationic polymers include cationic addition and condensation polymers.

In various embodiments, the cationic polymer will generally be composed partially of vinyl addition polymers of cationic and optionally non-ionic vinyl monomers.

Yet further suitable cationic polymers include cationic polyacrylamides including polyacrylamides cationized with dimethylsulfate or methyl chloride by the Mannich reactions to varying degrees to achieve varying degrees of cationicity.

Still yet further suitable cationic polymers include cationic polymers derived from quaternized dimethyl aminoethylacrylate, dicyanamide-formaldehyde condensates using one or both of formic acid and ammonium chloride as reactants, cationic cellulose starch compounds, carboxylated starch, xanthan gum, guar gum and polyacrylic acid.

One preferred cationic polymer is poly-diallyidimethyl-ammonium chloride.

Further cationic polymers are disclosed in U.S. Pat. No. 5,368,694 and U.S. Pat. No. 5,300,194, the disclosure of which is incorporated herein by reference. Generally with all these the molecular weight must be such that the polymer is water soluble or dispersible. Cationic derivatives of chitosan may also be used in accordance with the present disclosure. In further embodiments, the cationic polymer is a urea polymer with cyanoguanidine and formaldehyde.

The non-ionic surfactant may comprise various compositions suitable for removing the deposited contaminants from an industrial surface. A wide variety of non-ionic surfactants can be used in accordance with the present disclosure such as ethoxylated fatty alcohols which are either linear or branched and which may have a carbon chain length of anywhere from 8 to 22 carbons. The degree of ethoxylation may vary from 2 moles to 30 moles of ethylene oxide per mole of alcohol. Ethoxylated adducts of octyl and nonyl phenols as well as ethoxylated polyhydric alcohols including sorbitols or sorbitan esters may be used. Additional non-ionic surfactants include polyethylene oxide/polypropylene oxide block copolymers which would include the Pluronic® line of surfactants (BASF, Florham Park, N.J.) as well as ethoxylated versions of fatty acids and polyethylene glycol esters of phosphates, polyethylene glycol esters of fatty acids including esters derived from one mole of polyethylene glycol and one or two moles of fatty acids, tristyrylphenol ethoxylates and alkylpolyglycosides. In various embodiments, the hydrophilic-lipophilic balance (HLB) of the non-ionic surfactants is from 7 to 18 or from about 11 to 13.

In an embodiment the deposition control solution is applied through at least one high-pressure needle shower onto the surface of the papermaking fabric. In a further embodiment, the high pressure needle shower is an oscillating or fanning high-pressure needle shower. Additional application methods include flooded nip showers, adding the deposition control solution into the puddle of a roll doctor, and wicking applicators.

In an embodiment the deposition control solution is applied through at least one chemical fan shower onto the surface of the papermaking fabric.

Applying the deposition control solution may include injecting the combination of the cationic polymer, the phthalate/glycol based copolymers stream, and the non-ionic surfactant (deposition control solution) directly into the water flow in concentrated form or prediluted with fresh or process water. For example, the deposition control solution may be formed by mixing the cationic polymer, the phthalate/glycol based copolymers, and the non-ionic surfactant in a mixer upstream of a high-pressure needle shower or a chemical fan shower. Then, the formed deposition control solution may be provided to the high-pressure needle shower/chemical fan shower in a concentrated form for dilution at the high-pressure needle shower/chemical fan shower. Alternatively, the formed deposition control solution may be diluted prior to the high-pressure needle shower/chemical fan shower. For example, the diluted deposition control solution may be provided to the high-pressure needle shower/chemical fan shower and then applied without further dilution. Additionally, the diluted deposition control solution may be provided to the high-pressure needle shower/chemical fan shower for further dilution at the high-pressure needle shower/chemical fan shower before application.

The application of the deposition control solution further may be done either continuously or on an intermittent basis while the papermachine is running and paper is being produced. For example, the entire papermaking fabric may be treated at once in the cross direction basis or the deposition control solution may be injected into the high-pressure needle shower or a fan shower which oscillates and covers only a portion of the papermachine fabric at a time while it is in operation.

Chemical feed pumps may be used to accurately feed the deposition control solution into the high-pressure needle shower/chemical fan shower pipes such that a high-pressure needle shower/chemical fan shower concentration of 5-50,000 ppm of the combined phthalate/glycol based copolymer and cationic polymer is achieved.

Upon deposition by the high-pressure needle shower/chemical fan shower to the papermaking fabric, the deposition control solution is further diluted by residual water in the papermaking fabric to render an effective concentration of 2-30,000 ppm of the solids in the deposition control solution in the papermaking fabric.

In one exemplary embodiment, the deposition control solution may comprise about 1% to about 50% by wt. of solids of the at least one cationic polymer, about 1% to about 50% by wt. of solids of the at least one phthalate/glycol or PET:POET or PAT:POET based copolymer, and about 1% to about 20% by wt. of solids of the at least one non-ionic surfactant. The balance is water. In a further embodiment, the deposition control solution may comprise, for example, about 5% to about 25% by wt. of solids of at least one cationic polymer, about 5% to about 15% by wt. of solids of at least one cationic polymer, about 10% to about 25% by wt. of solids of at least one cationic polymer, or about 10% to about 15% by wt. of solids of at least one cationic polymer. In a further embodiment, the deposition control solution may comprise, for example, about 5% to about 25% by wt. of solids of at least one phthalate/glycol based or PET:POET or PAT:POET copolymer, about 5% to about 15% by wt. of solids of at least one phthalate/glycol or PET:POET or PAT:POET based copolymer, about 10% to about 25% by wt. of solids of at least one phthalate/glycol or PET:POET or PAT:POET based copolymer, or about 10% to about 15% by wt. of solids of at least one phthalate/glycol based copolymer. In yet a further embodiment, the deposition control solution may comprise, for example, and about 1% to about 20% by wt. of solids of at least one non-ionic surfactant, about 1% to about 15% by wt. of solids of at least one non-ionic surfactant, about 5% to about 20% by wt. of solids of at least one non-ionic surfactant, or about 5% to about 15% by wt. of solids of at least one non-ionic surfactant.

EXAMPLES

The following examples show the efficacy of the methods of controlling deposits on papermaking surfaces or fabrics on paper machines and the related deposition control solutions of this disclosure.

Example 1

The effect of "stickies" deposition on a polyester forming wire can be modeled, as well as the ability of surface modification chemistry to prevent this deposition. This example shows the ability of a phthalate/glycol copolymer and cationic polymer, in combination, to provide "stickies" deposition inhibition in a synergistic and unique way.

Figure 1:
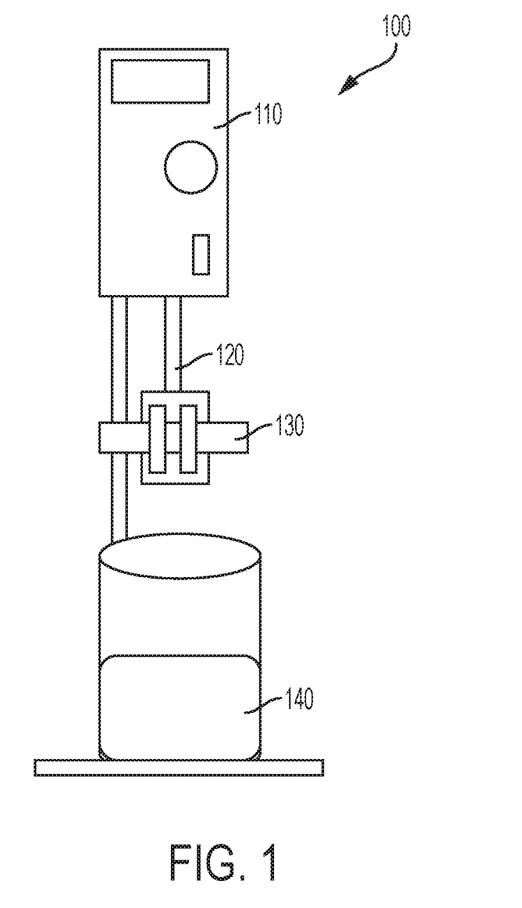
FIG. 1 is a schematic of a deposition testing set-up utilized in Example 1.

To model and test the deposition inhibition characteristics of phthalate/glycol copolymer and cationic polymer, in combination, a custom deposition testing set-up 100 was created. An overhead mixer 110 (IKA Laboratory Equipment, Germany) fit with an A-shaped plastic paddle 120 was created. The A-shaped plastic paddle 120 is able to secure a strip of polyester film 130 using friction only. The polyester film 130 simulates a polyester forming wire and the specific polyester film 130 used in the testing was polyester at 0.005" thickness and cut into 4.5×1.5" strips. A pretreatment solution was created to add the phthalate/glycol copolymer and cationic polymer to the polyester film 130. The pretreatment solution was generated by combining commercial whitewater which was pre-filtered to remove all suspended solids with the components of the deposition control solution to be tested. For baseline comparison, untreated test numbers were generated by adding no phthalate/glycol copolymer or cationic polymer to the water. The treated test numbers were generated by adding the phthalate/glycol copolymer and/or cationic polymer to the water at the dosage specified for the test. The test also used artificial stock 140 created using blotter paper and Avery 5162 labels blended together to create a solution of 0.3% stickies content by dry weight. The stickies content was a styrene acrylic/acrylate blend. The artificial stock 140 was heated to 135° F. for testing. Separately, the polyester film 130 was submerged into the whitewater solution and held to soak for a 10 second soak time to allow adsorption of the deposition control solution onto the polyester film 130. The polyester film 130 was then placed into the A-shaped plastic paddle 120 of the overhead mixer 110. The overhead mixer 110 rotates the polyester film 130 through the artificial stock 140 at 95 rpm to provide the contact time necessary for stickies deposition. At the conclusion of the mixing time, the polyester film 130 was removed from the A-shaped plastic paddle 120, rinsed with tap water, blotted dry and set out to air dry. Each test was performed three times to develop statistical metrics of the results.

The dried polyester films 130 with stickies deposition were analyzed based on image analysis. The dried polyester film samples 130 were scanned at 1200 dpi using a flatbed scanner. The images were then uploaded in ImageJ software (National Institutes of Health) for manipulation and analysis. The inhibition data was calculated as the ability of the pretreatment chemistry (phthalate/glycol copolymer and/or cationic polymer) to keep macrostickies that would have otherwise deposited onto the polyester film 130 from depositing. Specifically, the area of the untreated polyester film 130 covered by macrostickies (Y) was determined and the area of the pretreated polyester film 130 covered by macrostickies (Z) was determined. The percentage inhibition was then determined in accordance with formula 1 infra:

$$\% \text{ inhibition} = (Y-Z)/Y \times 100 \qquad (1)$$

The determined percentage inhibition for each of the tests is proved infra in Table 1 and Table 2. Table 1 provides test results when whitewater from virgin furnish (neutral sulfite semi-chemical) was utilized and Table 2 provides results when whitewater from recycled furnish (coated recycle board) was utilized.

TABLE 1

Filtered NSSC (neutral sulfite semi chemical) Whitewater

| Sample Code | phthalate/ glycol copolymer (ppm active) | Cationic cyanoguanidine polymer (ppm active) | Inhibition (%) |
| --- | --- | --- | --- |
| Z.a | 30 ppm | 0 ppm | 53.2 |
| Z.b | 0 ppm | 12 ppm | 0 |
| Z.c | 30 ppm | 12 ppm | 76.5 |

TABLE 2

Filtered CRB (coated recycle board) Whitewater

| Sample Code | phthalate/ glycol copolymer (ppm active) | Cationic cyanoguanidine polymer (ppm active) | Inhibition (%) |
| --- | --- | --- | --- |
| Z.a | 30 ppm | 0 ppm | 62.8 |
| Z.b | 0 ppm | 12 ppm | 0 |
| Z.c | 30 ppm | 12 ppm | 81.4 |

As illustrated in Table 1 and Table 2, the phthalate/glycol copolymer chemistry alone (Z.a) had a positive effect in keeping stickies deposition off of the polyester film 130 with both virgin furnish and recycled furnish. Adding the cationic cyanoguanidine polymer to the phthalate/glycol copolymer (Z.c), however, was able to significantly improve the inhibition properties of the solution. The cationic cyanoguanidine polymer on its own (Z.b) had no inhibitory effect. The combination of the phthalate/glycol copolymer and the cationic cyanoguanidine polymer unexpectantly yielded results surpassing the inhibition of each components individually, whereby Z.c>Z.a+Z.b.

Example 2

The effect of "stickies" deposition on the water flow rate through a virgin press felt can be modeled, as well as the ability of surface modification chemistry to mitigate the reduction in flow rate as a result of press felt soiling. This example shows that by treating the press felt with a deposition control solution, the water flow reduction can be mitigated. The example, further, demonstrates that a combination of two inhibitor chemistries in the deposition control solution can work synergistically to better mitigate water flow reduction through press felt than the additive inhibitor effects of those same chemistries tested individually. In other words, the effect of the combination of a phthalate/glycol copolymer and cationic polymer in accordance with the present disclosure provided an unexpected synergistic deposition prevention effect when used in combination compare to the phthalate/glycol copolymer chemistry and cationic polymer chemistry individually.

Figures 2A, 2B:
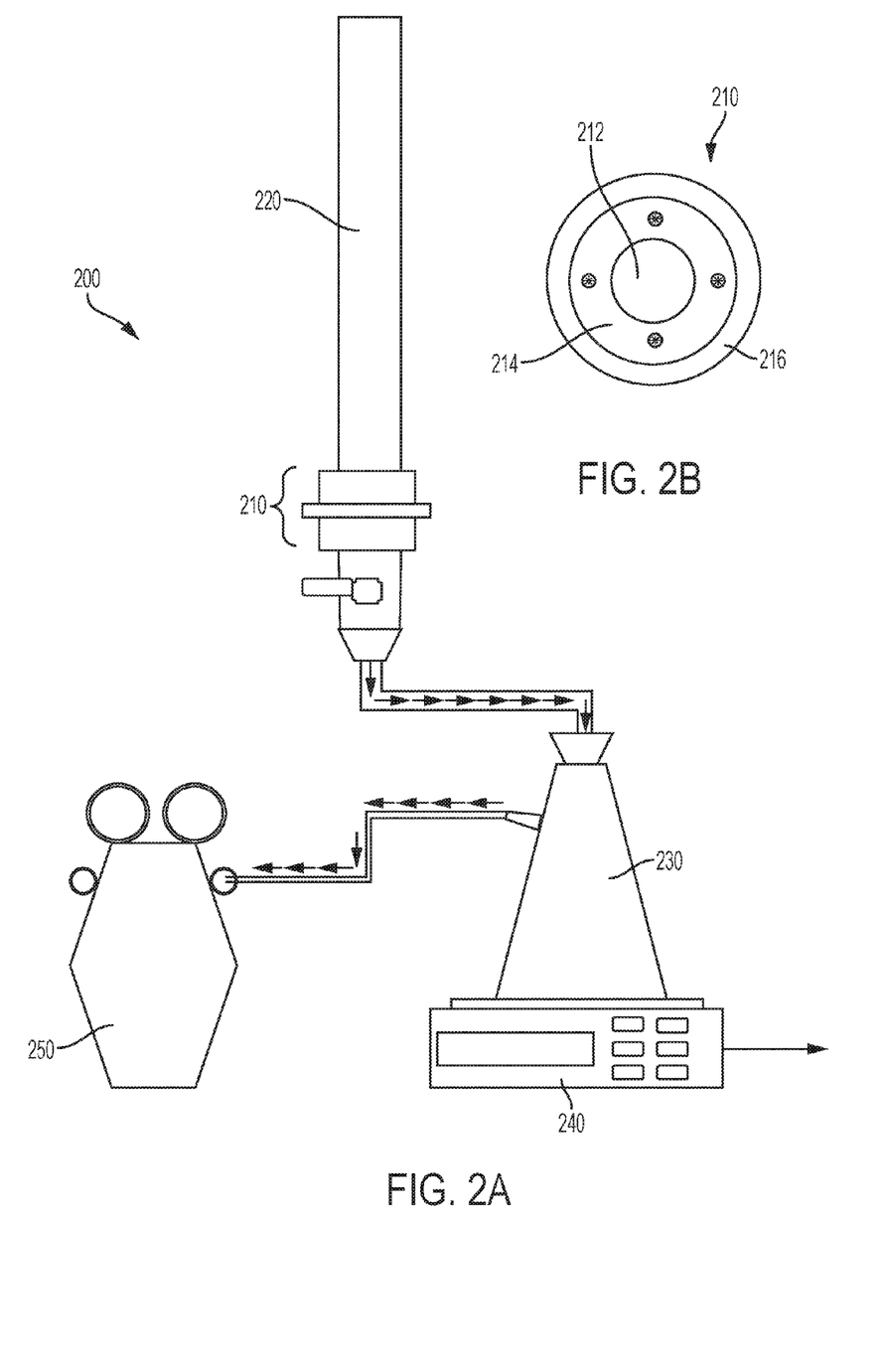
FIG. 2A is a schematic of a machine fabric dewatering unit utilized in Example 2.
FIG. 2B is a schematic of a press felt rig of FIG. 2A

To model and test the water flow reduction mitigation characteristics of phthalate/glycol copolymer and cationic polymer, in combination, a custom machine fabric dewatering unit 200 was created. The machine fabric dewatering unit 200 was fitted with a press felt rig 210. The press felt rig 210 includes virgin press felt 212, a felt mounting top plate 214, and a felt mounting bottom plate 216. The press felt 212 was cut into circles of diameter matching the dimensions of the press felt rig 210. The press felt 212 was then secured in the press felt rig 210 by placing the press felt 212 between the felt mounting top plate 214 and the felt mounting bottom plate 216 and securing the felt mounting top plate 214 and the felt mounting bottom plate 216 together. Once secured, press felt rig 210 was mounted into the machine fabric dewatering unit 200. The machine fabric dewatering unit 200 includes a solution column 220 to hold an aqueous solution for passage through the press felt rig 210. After passage through the press felt rig 210, the aqueous solution travels to a reservoir 230 placed on a weight recording balance 240. Three aqueous solutions were passed through the press felt 212 for each test cycle. Each aqueous solution was provided from the solution column 220 as a 2L bolus heated to 120° F. A vacuum pump 250 was attached to the reservoir 230 such that the aqueous solution was pulled through the press felt 212 at 15 inHg. The three aqueous solutions consisted of deionized (DI) water for the first two aqueous solutions and a contaminant containing solution for the third aqueous solution. The contaminant containing solution comprised an anionic paper machine contaminant consistent with that is found in industry (organic plastic dispersion). The drainage rate of the second DI water solution (weight of solution per unit time) was measured and recorded with the weight recording balance 240. Then the drainage rate of the contaminant containing solution (weight of solution per unit time) was measured and recorded with the weight recording balance 240. For baseline comparison, untreated test numbers were generated by adding no phthalate/glycol copolymer or cationic polymer to the third aqueous solution. The treated test numbers were generated by adding the phthalate/glycol copolymer and/or cationic polymer to the third aqueous solution at the dosage specified for the test prior to it passing through the press felt sample 212. The test procedure was repeated three times for each combination to develop statistical metrics of the results.

The percentage inhibition of deposition was determined by analyzing the drainage rates of the second and third aqueous solutions. The drainage rate of the second aqueous solution (DI water) through the uncontaminated virgin press felt 212 was determined (X). Additionally, the drainage rate of the third aqueous solution (contaminant containing solution) without any phthalate/glycol copolymer or cationic polymer through the press felt 212 was also determined (Y). Finally, the drainage rate of the third aqueous solution (contaminant containing solution) with phthalate/glycol copolymer and/or cationic polymer through the press felt 212 was also determined (Z). The percentage inhibition was then determined in accordance with formula 2 infra:

$$\% \text{ inhibition} = 100 - (X-Z)/(X-Y) \times 100 \qquad (2)$$

The determined percentage inhibition for each of the tests is proved infra in Table 3.

TABLE 3

| Sample Code | phthalate/ glycol copolymer (ppm active) | Cationic cyanoguanidine polymer (ppm active) | Average Drainage Rate (g/s) | Inhibition (%) |
| --- | --- | --- | --- | --- |
| X | 0 ppm | 0 ppm | 67.4 | — |
| Y | 0 ppm | 0 ppm | 28.8 | — |
| Z.a | 30 ppm | 0 ppm | 42.7 | 36.0 |

TABLE 3-continued

| Sample Code | phthalate/ glycol copolymer (ppm active) | Cationic cyanoguanidine polymer (ppm active) | Average Drainage Rate (g/s) | Inhibition (%) |
|---|---|---|---|---|
| Z.b | 0 ppm | 12 ppm | 29.8 | 2.6 |
| Z.c | 30 ppm | 12 ppm | 60.2 | 81.3 |

It can be seen that the anionic paper machine contaminant in the contaminant containing solution was able to soil the virgin press felt in such a way as to decrease the water flow through it from 67.4 g/s to 28.8 g/sec. It can be further seen that both the phthalate/glycol copolymer chemistry (Z.a) and cationic cyanogaunidine chemistry (Z.b) individually have some ability to inhibit the contaminant from plugging the press felt as aggressively (36.0% and 2.6% inhibition, respectively). However, the combination of the phthalate/glycol copolymer chemistry and cationic cyanogaunidine chemistry (Z.c) resulted in unexpected and synergistic effect with better inhibition effect than not only the inhibitors in separate solutions, but also in their additive effect (Z.a+Z.b)

It is further noted that terms like "preferably," "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of controlling deposits on papermaking surfaces or fabrics on paper machines comprising:
    applying a deposition control solution to the papermaking fabrics to inhibit deposition of organic contaminants therein, wherein the deposition control solution comprises
        at least one cationic polymer,
        at least one phthalate/glycol or polyethylene terephthalate/polyoxyethylene terephthalate (PET:POET) or polyalkylene terephthalate/polyoxyethylene terephthalate (PAT:POET) based copolymer, and
        optionally at least one non-ionic surfactant.

2. The method of controlling deposits on papermaking surfaces or fabrics on paper machines of claim 1 wherein the phthalate/glycol based copolymer comprises a hydrophilically modified polyesters formed from monomers comprising terephthalic acid, dimethyl terephthalic acid, polyglycols, diols, and polyhydric alcohols.

3. The method of controlling deposits on papermaking surfaces or fabrics on paper machines of claim 2 wherein the phthalate/glycol based copolymers are the result of a polymerization reaction between a first co-monomer species selected from the group consisting of terephthalate, polyoxyethylene, ethylene glycol, propylene glycol, and methyl capped polyethylene glycol and a second co-monomer species selected from the group consisting of polypropylene glycol, block copolymers of ethylene oxide, and block copolymers of propylene oxide.

4. The method of controlling deposits on papermaking surfaces or fabrics on paper machines of claim 1 wherein the terephthalate/glycol copolymer is selected from the group consisting of PEG/POET (polyethyleneglycol/polyoxyethyleneterephthalate), PET/PEG (polyethylene terephthalate/polyethylene glycol) and phthalate/glycerol/ethylene glycol polymers.

5. The method of controlling deposits on papermaking surfaces or fabrics on paper machines of claim 1 wherein the phthalate/glycol based copolymers are polyalkylene terephthalate and alkyl capped polyoxyethylene terephthalate copolymers.

6. The method of controlling deposits on papermaking surfaces or fabrics of claim 1 wherein the phthalate/glycol based polymers are copolymers of dimethyl terephthalate, ethylene glycol, propane-1,2-diol, polyethylene glycol, methyl capped polyethylene glycol, and an polyhydric alcohol which has the general formula of $C_nH_x(OH)_y$ where n=2-6, y=2-6 and x=(2n+2)-y.

7. The method of controlling deposits on papermaking surfaces or fabrics of claim 1 wherein the phthalate/glycol based polymers are copolymers of dimethyl terephthalate, ethylene glycol, propane-1,2-diol, tetramethylolmethane, polyethylene glycol and methyl capped polyethylene glycol.

8. The method of controlling deposits on papermaking surfaces or fabrics on paper machines of claim 7 wherein the high pressure needle shower is an oscillating high-pressure needle shower.

9. The method of controlling deposits on papermaking surfaces or fabrics on paper machines of claim 1 wherein the deposition control solution is applied through at least one high-pressure needle shower onto the papermaking surface or fabric.

10. The method of controlling deposits on papermaking surfaces or fabrics on paper machines of claim 1 wherein the deposition control solution is applied through at least one chemical fan shower onto the surface of the papermaking surface or fabric.

11. The method of controlling deposits on papermaking surfaces or fabrics on paper machines of claim 1 further comprising mixing a cationic polymer stream, a phthalate/glycol based copolymers stream, and optionally a non-ionic surfactant stream in a mixer to form the deposition control solution upstream of a high-pressure needle shower or a chemical fan shower.

12. The method of controlling deposits on papermaking surfaces or fabrics on paper machines of claim 1 wherein the deposition control solution is fed to a high-pressure needle shower or a chemical fan shower, diluted with water, and applied to the papermaking surfaces or fabric at a concentration of 5 to 50,000 ppm.

13. The method of controlling deposits on papermaking surfaces or fabrics on paper machines of claim 1 wherein the deposition control solution comprises
    about 1% to about 50% by wt. of solids of the at least one cationic polymer, about 1% to about 50% by wt. of solids of the at least one phthalate/glycol based copolymer, and about 1% to about 20% by wt. of solids of the at least one non-ionic surfactant.

14. The method of controlling deposits on papermaking surfaces or fabrics on paper machines of claim 1 wherein the deposition control solution comprises about 5% to about 25% by wt. of solids of at least one cationic polymer, about 5% to about 25% by wt. of solids of at least one phthalate/glycol based copolymer, and optionally about 1% to about 20% by wt. of solids of at least one non-ionic surfactant.

15. The method of claim 14 wherein the deposition control solution is added to the papermaking fabric and the deposition control solution is diluted by residual water in the papermaking fabric to render an effective concentration of 2-30000 ppm in the papermaking fabric.

16. The method of controlling deposits on papermaking surfaces or fabrics on paper machines of claim 1 wherein deposition of deleterious substance is inhibited by the application of the deposition control solution.

17. The method of controlling deposits on papermaking surfaces or fabrics on paper machines of claim 1 wherein the application of the deposition control solution results in an increase of the adsorptivity of the phthalate/glycol based copolymer onto the papermaking fabric as compared to a solution consisting of only phthalate/glycol based copolymer.

18. The method of controlling deposits on papermaking surfaces or fabrics on paper machines of claim 17 wherein the application of the deposition control solution results in an increase of the adsorptivity of the phthalate/glycol based copolymer onto the papermaking surface or fabric by at least 20 as compared to a solution consisting of only phthalate/glycol based copolymer.

19. The method of controlling deposits on papermaking surfaces or fabrics on paper machines of claim 1 wherein the application of the deposition control solution results in a decrease in the formation or accumulation of cationic control polymers when used in combination with phthalate/glycol based copolymers.

20. The method of controlling deposits on papermaking surfaces or fabrics on paper machines of claim 19 wherein the cationic polymer polyurea is dicyandiamide, based urea or melamine formaldehyde copolymer.

21. The method of controlling deposits on papermaking surfaces or fabrics on paper machines of claim 1 wherein the at least one cationic polymer comprises a cationic polyurea.

22. The method claimed in claim 1 wherein said cationic polymer is poly-diallyldimethylammonium chloride.

23. The method claimed in claim 1 wherein said cationic polymer is a urea, polymer with cyanoguanidine and formaldehyde copolymer.

24. The method of controlling deposits on papermaking surfaces or fabrics on paper machines of claim 1 wherein the deposition control solution is applied on a continuous basis.

25. The method of controlling deposits on papermaking surfaces or fabrics on paper machines of claim 1 wherein the deposition control solution is applied on an intermittent basis.

26. A method of controlling deposits on papermaking surfaces or fabrics on paper machines comprising:

applying through at least one high-pressure needle shower or at least one chemical fan shower a deposition control solution to the papermaking surfaces or fabrics to inhibit deposition of organic deposits therein, wherein the deposition control solution comprises about 1% to about 50% by wt. of solids of at least one cationic polymer, about 1% to about 50% by wt. of solids of a branched polyalkylene terephthalate and alkyl capped polyoxyethylene terephthalate copolymers, and optionally about 1% to about 20% by wt. of solids of at least one non-ionic surfactant.

27. The method of claim 26 wherein the deposition control solution is added to the papermaking fabric and the solution is diluted by the residual water in the papermaking fabric to render an effective concentration of 2-30000 ppm in the papermaking fabric.

28. The method of controlling deposits on papermaking surfaces or fabrics on paper machines of claim 26 wherein deposition of deleterious substance is inhibited by the application of the deposition control solution.

29. The method of controlling deposits on papermaking surfaces or fabrics on paper machines of claim 26 wherein the application of the deposition control solution results in an increase of the adsorptivity of the phthalate/glycol based copolymer onto the papermaking fabric as compared to a solution consisting of only phthalate/glycol based copolymer.

30. The method of controlling deposits on papermaking surfaces or fabrics on paper machines of claim 29 wherein the application of the deposition control solution results in an increase of the adsorptivity of the phthalate/glycol based copolymer onto the papermaking fabric by at least 20 as compared to a solution consisting of only phthalate/glycol based copolymer.

31. The method of controlling deposits on papermaking surfaces or fabrics on paper machines of claim 26 wherein the application of the deposition control solution results in a decrease in the formation or accumulation of cationic control polymers when used in combination with phthalate/glycol based copolymers.

32. The method of controlling deposits on papermaking surfaces or fabrics on paper machines of claim 26 wherein the deposition control solution is fed to a high-pressure needle shower or a chemical fan shower, diluted with water, and applied to the papermaking fabric at a concentration of 5-30,000 ppm of the cationic polymer and at a concentration of 5-30,000 ppm of the polyalkylene terephthalate and alkyl capped polyoxyethylene terephthalate copolymers.

* * * * *